(12) United States Patent
Hsiao

(10) Patent No.: US 6,405,751 B1
(45) Date of Patent: Jun. 18, 2002

(54) GAS SAFETY VALVE

(76) Inventor: Chi-Chen Hsiao, 531, Pei-Shin Street, Chia-Yi City (TW)

( * ) Notice: Subject to any disclaimer, the term of this patent is extended or adjusted under 35 U.S.C. 154(b) by 0 days.

(21) Appl. No.: 09/909,892

(22) Filed: Jul. 23, 2001

(51) Int. Cl.⁷ .............................................. F16K 17/30
(52) U.S. Cl. ...................................................... 137/517
(58) Field of Search ................................. 137/517, 519, 137/519.5, 460, 71

(56) References Cited

U.S. PATENT DOCUMENTS

| 4,590,962 A | * | 5/1986 | Tespa | 137/460 X |
| 4,632,146 A | * | 12/1986 | Looney | 137/539.5 |
| 4,932,434 A | * | 6/1990 | Taylor | 137/469 |
| 5,983,927 A | | 11/1999 | Hsiao | |

* cited by examiner

Primary Examiner—Michael Powell Buiz
Assistant Examiner—Meredith Schoenfeld
(74) Attorney, Agent, or Firm—Larson & Taylor PLC

(57) ABSTRACT

A gas safety valve comprises a main body, a valve seat, a restraining member, and an engaging member. The main body includes an inner threading for threading engagement with the valve seat and the restraining member. The valve seat comprises a valve block, a spring, and an adjusting element. The position of the adjusting element can be adjusted when an elastic constant of the spring is not within a predetermined operational range, a distance between the valve block and the valve seat is thus varied to assure blockage of a longitudinal through-hole of the valve seat by the valve block, thereby preventing mass leakage.

2 Claims, 2 Drawing Sheets

GAS SAFETY VALVE

BACKGROUND OF THE INVENTION

1. Field of the Invention

The present invention relates to an improved gas safety valve. In particular, the present invention relates to an improved gas safety valve that allows adjustment of a distance between a valve block and an inlet of a valve seat even though the elastic constant of a spring biasing the valve block is not within the predetermined operational range such that when excessive flow occurs, a longitudinal through-hole of the valve seat is reliably blocked by the valve block, thereby preventing mass leakage.

2. Description of the Related Art

Pressure difference has already been utilized in gas safety valves for assuring safety use of gas U.S. Pat. No. 5,983,928 to Hsiao issued on Nov. 16, 1999 discloses a gas safety valve comprising a valve body with a longitudinal through-hole for receiving a ball. The longitudinal through-hole of the valve body comprises several sections of various inner diameters such that when mass leakage occurs, the ball is moved to compress a spring and block the longitudinal through-hole as a result of a pressure difference between two sides of the ball. Such a structure can be applied to gas sources of different pressure by means of simply changing the spring. However, the elastic constant of springs cannot be always identical even if they are manufactured under the same condition and thus fail to meet the requirement of precision. Namely, the ball might be incapable of blocking the longitudinal through-hole of the valve body, as the elastic constant of the spring is not within the predetermined operational range.

SUMMARY OF THE INVENTION

It is the primary object of the present invention to provide an improved gas safety valve that allows adjustment to assure blockage of the longitudinal through-hole of the valve body, thereby preventing mass leakage.

The gas safety valve in accordance with the present invention allows adjustment of a distance between a valve block and an inlet of a valve seat by means of adjusting the position of an adjusting element that is mounted in the valve seat and has an end to which an end of a spring is attached. The other end of the spring is attached to the valve block. Thus, even though the elastic constant of the spring is not within the predetermined operational range, the distance between the valve seat and the valve block can be adjusted such that when excessive flow occurs, a longitudinal through-hole of the valve seat is reliably blocked by the valve block, thereby preventing mass leakage.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
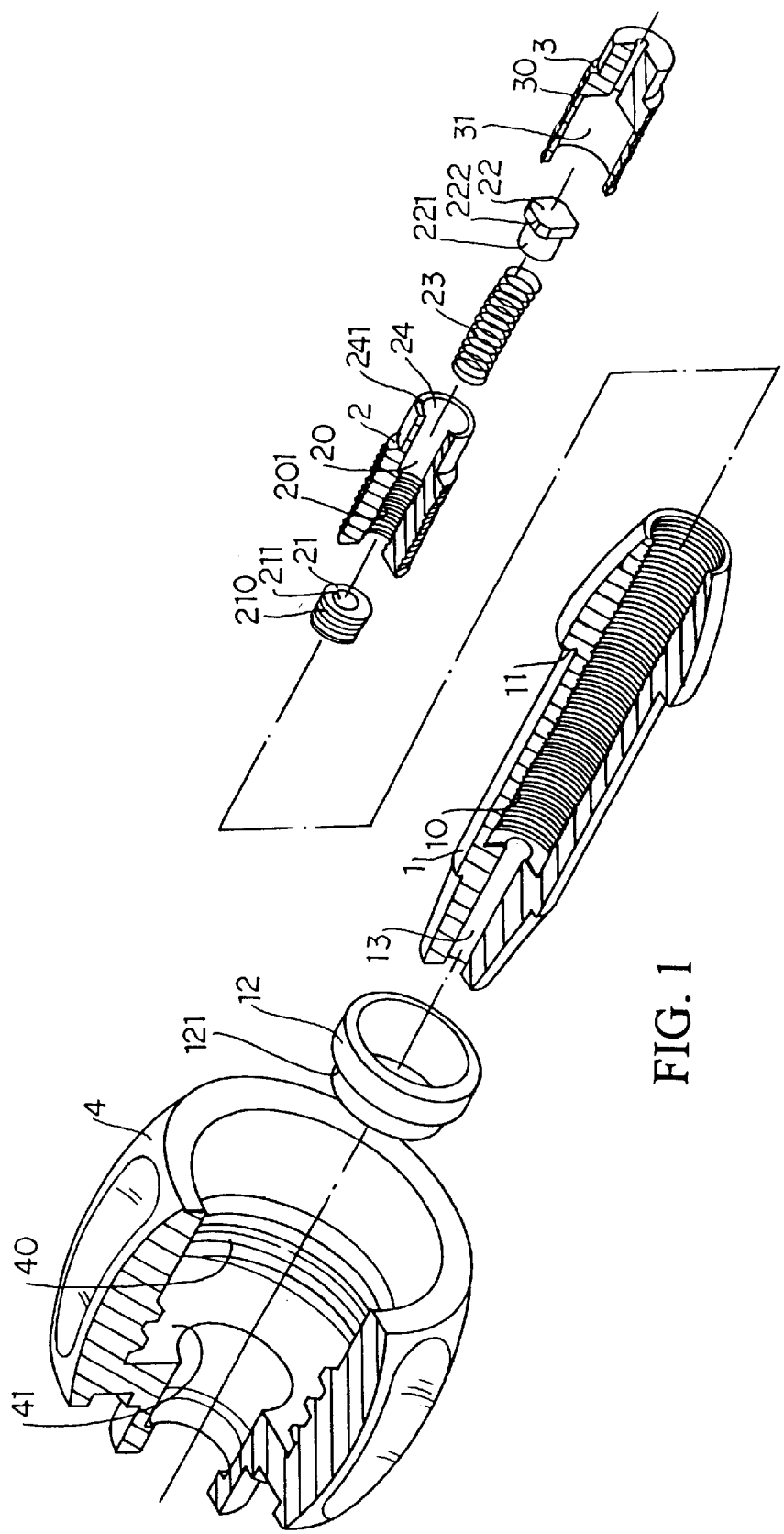
FIG. 1 is an exploded perspective view of a gas safety valve in accordance with the present invention.
Figure 2:
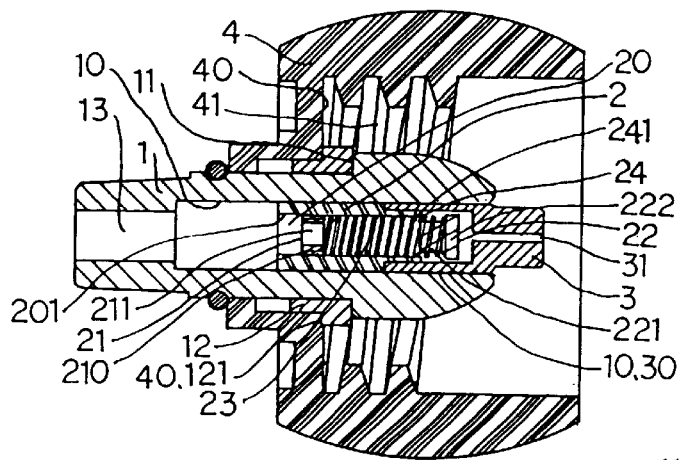
FIGS. 2 and 3 are longitudinal sectional views illustrating operation of the gas safety valve in accordance with the present invention.

Referring to FIGS. 1 and 2, a gas safety valve in accordance with the present invention generally includes a main body 1, a valve seat 2, a restraining member 3, and an engaging member 4. The gas safety valve is mounted between a gas source (not shown) and a gas stove (not shown).

The main body 1 is tubular and comprises a longitudinal through-hole 13 having a threaded section (see inner threading 10) for threading engagement with the valve seat 2 and the restraining member 3. The main body 1 further comprises a stop 11 on an outer periphery thereof for limiting a meltable element 12 that is mounted around the main body 1.

The valve seat 2 is a tubular member and comprises a longitudinal through-hole 20 having a threaded section (see inner threading 201) for threading engagement with an outer threading 210 of an adjusting element 21. The adjusting element 21 is tubular and comprises a hole 211 that is communicated with the longitudinal through-hole 13 of the main body 1. A valve block 22 and a spring 23 are mounted in the valve seat 2, wherein the valve block 22 comprises a stem 221 having an end to which the spring 23 is attached. The other end of the stem 221 is connected to a flat head 222. The other end of the spring 23 is attached to an end of the adjusting element 21. When excessive flow of gas occurs, a pressure difference between two sides of the flat head 222 urges the flat head 222 to overcome the spring 23, and the flat head 222 is moved to a position blocking an inlet 24 of the longitudinal through-hole 20 of the valve seat 2, thereby preventing mass leakage. When the excessive flow problem is solved, in order to release blockage of the inlet 24 of the valve seat 20, an overflow gap 241 is defined in an inlet end of the valve seat 2 having the inlet 24 and thus provides communication between the inlet 24 and the longitudinal through-hole 13 of the main body 1, which will be described later.

The restraining member 3 includes an outer threading 30 for threading engagement with the threaded section 10 of the main body 1. The restraining member 3 is hollow and includes a through-hole 31 having an end communicated with the inlet 24 of the valve seat 2. The other end of the through-hole 31 is communicated with the gas source (not shown). The end of the through-hole 31 has an inner diameter greater than an outer diameter of the inlet 24 of the valve seat 2 and greater than an outer diameter of the flat head 222. The outer diameter of the flat head 222 is greater than an inner diameter of the other end of the through-hole 31. Thus, the restraining member 3 can be mounted around the inlet end of the valve seat 2 with the flat head 222 restrained in the through-hole 31 of the restraining member 3.

The main body 1 is connected to a coupler (not shown) of the gas source (not shown) by the engaging member 4. The meltable element 12 mounted around the main body 1 is placed into the engaging member 4 with a stop 121 on the meltable element 12 abutting against an annular face of a restraining end 41 of the engaging member 4. The main body 1 is coupled to the coupler of the gas source by means of threading engagement between an inner threading 40 of the engaging member 4 and the coupler of the gas source. Structure of the meltable element 12 is conventional and thus not described in detail.

Figure 3:
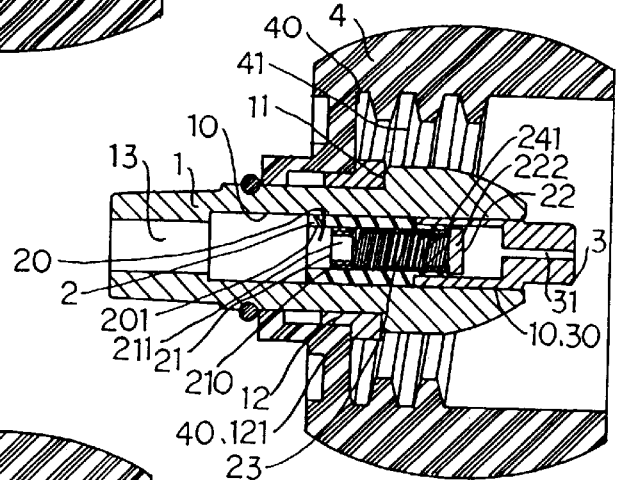
Figure 5:
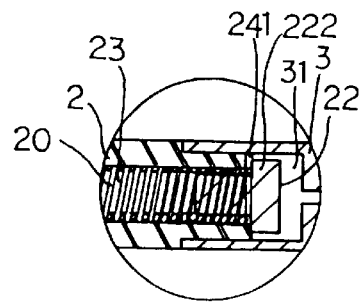
FIG. 5 is an enlarged view of a portion in FIG. 3.

Referring to FIGS. 3 and 5, when excessive flow of gas occurs, the pressure difference generated as a result of excessive flow overcomes the spring 23 and the flat head 222 is moved to a position blocking the inlet 24 of the valve seat 2, thereby preventing mass leakage. In a case that the excessive flow problem is solved, e.g., a leaking hole is patched or a disengaged pipe is re-connected, and that gas stove is still in a closed state to stop outflow of gas, the flat head 222 still blocks the inlet 24 of the valve seat 2 under the action of the pressure difference, but a minor amount of gas may enter the longitudinal through-hole 13 of the main body 1 via the overflow gap 241, the inlet 24, and the longitudinal through-hole 20 of the valve seat 20. Thus, the pressure difference between two sides of the flat head 222 is gradually relieved, the spring 23 is no longer compressed and thus returns the flat head 222. Namely, the inlet 24 is no longer blocked by the flat head 20, thereby providing a clear passage for gas.

By means of providing the above-mentioned structure, it is noted that when the spring 23 has an elastic constant within the predetermined operational range, the flat head 222 can be moved by the pressure difference to overcome the spring 23 and to reliably block the inlet 24 of the valve seat 2, thereby preventing mass leakage. After the leakage problem is removed, the flat head 222 no longer blocks the inlet 24 of the valve seat 2 and thus provides a clear passage for gas.

Figure 4:
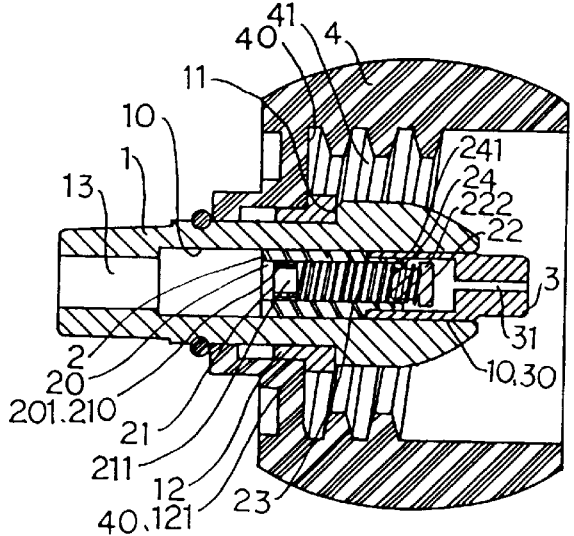
FIG. 4 is a longitudinal sectional view illustrating adjustment of a position of an adjusting element.

Nevertheless, since the springs used cannot have a fixed elastic constant even under the same manufacturing condition, as encountered in conventional designs, not every one of the produced gas safety valves meet the standards of quality examination and the precision requirement. Namely, the produced spring 23 may have an elastic constant not within the predetermined operational range. As a result, the spring 23 hinders blockage of the inlet 24 of the valve seat 2 by the flat head 222. In order to eliminate this problem, as illustrated in FIG. 4, the position of the adjusting element 21 in the main body 10 can be adjusted. When the flat head 222 cannot be moved to the position blocking the inlet 24 of the valve seat 2 (i.e., the pressure difference is insufficient to overcome the spring 23), one can remove the valve seat 2 from the main body 1 and then turning the adjusting element 21 to urge it toward the gas stove.

Thus, the distance between the valve block 22 and the inlet 24 of the valve seat 2 becomes smaller after adjustment. As a result, the flat head 222 can be moved by the pressure difference to the position blocking the inlet 24 of the valve seat 2, thereby preventing mass leakage. To the contrary, when the adjusting element 21 is moved in a direction toward the gas stove, the distance between the valve block 22 and the inlet 24 of the valve seat 2 becomes larger after adjustment. As a result, the flat head 222 can be moved by a larger pressure difference to the position blocking the inlet 24 of the valve seat 2, thereby preventing mass leakage. Accordingly, all of the gas safety valves have the same quality and meet the standards of quality examination.

According to the above description, it is appreciated that the position of the adjusting element 21 can be adjusted to vary the distance between the valve block 22 and the inlet 24 of the valve seat 2 such that the flat head 222 may reliably block the inlet 24 of the valve seat 2, thereby preventing mass leakage and thereby providing products with the same quality and meeting the standards of quality examination.

Although the invention has been explained in relation to its preferred embodiment, it is to be understood that many other possible modifications and variations can be made without departing from the scope of the invention as hereinafter claimed.

What is claimed is:

1. A gas safety valve comprising a main body, a valve seat, a restraining member, and an engaging member, a meltable element being mounted around the main body that is mounted in the engaging member, the meltable element comprising a stop abutting against an annular face of a restraining end of the engaging member, the engaging member including an inner threading for threading engagement with a gas source, thereby connecting the main body to a coupler of a gas source, the improvements comprising:

the main body being tubular and comprising a longitudinal through-hole having a threaded section for threading engagement with the valve seat and the restraining member;

the valve seat being tubular and comprising a longitudinal through-hole having a threaded section, an adjusting element having an outer threading for threading engagement with the threaded section of the longitudinal through-hole of the valve seat, further comprising a valve block and a spring mounted in the valve seat, the valve block comprising a flat head and a stem, the spring having a first end attached to the adjusting element and a second end attached to the stem;

the restraining member comprising an outer threading for threading engagement with the threaded section of the longitudinal through-hole of the main body, the restraining member being tubular and comprising a through-hole having a first end communicated with an inlet of an inlet end of the longitudinal through-hole of the valve seat, the through-hole of the restraining member further including a second end communicated with the gas source, the first end of the through-hole of the restraining member having an inner diameter greater than an outer diameter of the inlet of the valve seat and greater than an outer diameter of the flat head, the outer diameter of the flat head being greater than an inner diameter of the second end of the through-hole of the restraining member, the restraining member being mounted around the inlet end of the valve seat, the flat head being restrained in the through-hole of the restraining member, a pressure difference resulting from an excessive flow of gas overcoming the spring and moving the flat head to block the inlet of the valve seat, thereby preventing mass leakage.

2. The gas safety valve as claimed in claim 1, wherein a position of the adjusting element in the valve seat is adjustable by turning the adjusting element, thereby adjusting a distance between the flat head and the inlet of the valve seat.

* * * * *